US012695632B2

(12) United States Patent
Lindskog et al.

(10) Patent No.: US 12,695,632 B2
(45) Date of Patent: Jul. 28, 2026

(54) SECURE ATTESTATION OF HARDWARE DEVICE

(71) Applicant: TELEFONAKTIEBOLAGET LM ERICSSON (PUBL), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/843,099

(22) PCT Filed: Feb. 1, 2023

(86) PCT No.: PCT/IB2023/050892
§ 371 (c)(1),
(2) Date: Aug. 30, 2024

(87) PCT Pub. No.: WO2023/166363
PCT Pub. Date: Sep. 7, 2023

(65) Prior Publication Data
US 2025/0168020 A1 May 22, 2025

Related U.S. Application Data

(60) Provisional application No. 63/316,710, filed on Mar. 4, 2022.

(51) Int. Cl.
*H04L 9/32* (2006.01)
*G06F 21/57* (2013.01)

(52) U.S. Cl.
CPC ............ *H04L 9/3278* (2013.01); *G06F 21/57* (2013.01)

(58) Field of Classification Search
None
See application file for complete search history.

(56) References Cited

U.S. PATENT DOCUMENTS 8,525,169 B1 * 9/2013 Edelstein .............. H10W 46/00
365/46
8,699,714 B2 * 4/2014 Tuyls .................... G06F 21/602
380/278

(Continued)

FOREIGN PATENT DOCUMENTS

WO 2021259500 12/2021
WO 2021259501 12/2021

OTHER PUBLICATIONS

Chalmers University of Technology, "Chalmers material research—Access and booking", https://www.chalmers.se/en/researchinfrastructure/CMAL/Pages/Booking.aspx.

(Continued)

*Primary Examiner* — Backhean Tiv
(74) *Attorney, Agent, or Firm* — Murphy, Bilak & Homiller, PLLC

(57) ABSTRACT
A device comprises a plurality of hardware, HW, modules including a first HW module comprising a Physically Unclonable Function, PUF, the first HW module or the plurality of HW modules being communicated with a requester. The device receives (1006), from the requester, a request to transmit an output to the requester. It activates (1008) the PUF, reads a response from the PUF, and adds the response to an output. The device transmits (1012) the output to the requester, and it receives (1002) one or more of a firmware, FW, component, a software, SW, component, or a bitstream, BS, component before receiving (1006) the request from the requester.

8 Claims, 11 Drawing Sheets

(56) References Cited

U.S. PATENT DOCUMENTS

| | | | | |
|---|---|---|---|---|
| 8,868,923 | B1* | 10/2014 | Hamlet | H04L 9/00 |
| | | | | 326/8 |
| 9,208,355 | B1* | 12/2015 | Areno | H04L 9/0866 |
| 9,558,358 | B2* | 1/2017 | Aissi | H04L 9/0869 |
| 9,875,378 | B2* | 1/2018 | Benoit | G06F 21/79 |
| 10,742,421 | B1* | 8/2020 | Wentz | H04L 9/0897 |
| 10,855,476 | B2* | 12/2020 | Dafali | H04L 9/3278 |
| 11,218,324 | B2* | 1/2022 | Wentz | H04L 9/088 |
| 11,388,013 | B2* | 7/2022 | Razi | H04L 9/3278 |
| 12,107,973 | B1* | 10/2024 | Cambou | H04L 9/0866 |
| 12,333,055 | B2* | 6/2025 | Lindskog | G06F 21/73 |
| 12,395,358 | B2* | 8/2025 | Lindskog | G06F 21/575 |
| 2014/0091832 | A1* | 4/2014 | Gotze | H03K 19/003 |
| | | | | 326/8 |
| 2014/0189890 | A1* | 7/2014 | Koeberl | G09C 1/00 |
| | | | | 726/34 |
| 2015/0277930 | A1* | 10/2015 | Sarangdhar | G06F 21/572 |
| | | | | 713/2 |
| 2016/0188868 | A1* | 6/2016 | Otturu | G06F 21/44 |
| | | | | 713/1 |
| 2017/0295015 | A1* | 10/2017 | Pedersen | H04L 9/0894 |
| 2018/0005186 | A1* | 1/2018 | Hunn | G06Q 10/10 |
| 2019/0305973 | A1* | 10/2019 | Dewan | H04L 9/14 |
| 2019/0363888 | A1* | 11/2019 | Brostrom | H04L 9/3234 |
| 2021/0110042 | A1* | 4/2021 | Dewan | H04L 9/088 |
| 2021/0312057 | A1* | 10/2021 | Kloth | G06F 21/575 |
| 2021/0314365 | A1* | 10/2021 | Smith | G06F 11/301 |
| 2022/0198018 | A1* | 6/2022 | Wentz | H04L 9/3268 |
| 2022/0217003 | A1* | 7/2022 | Cambou | H04L 9/3278 |
| 2022/0292203 | A1* | 9/2022 | Severns-Williams | |
| | | | | G06F 21/57 |
| 2023/0163980 | A1* | 5/2023 | Cambou | H04L 9/0869 |
| | | | | 713/165 |
| 2024/0069889 | A1* | 2/2024 | Choi | H04L 9/3239 |
| 2024/0152619 | A1* | 5/2024 | Dewan | H04L 9/14 |
| 2025/0168020 | A1* | 5/2025 | Lindskog | H04L 9/3278 |

OTHER PUBLICATIONS

Xilinx, "Zynq UltraScale+ Device; Technical Reference Manual" UG1085 (v2.2) Dec. 4, 2020.

* cited by examiner

DEVICE

HARDWARE MODULES

PUF

OWF

HW COMPONENTS

FUZZY
EXTRACTOR /
ERROR
CORRECTION

CPU

I/O

GPU

NVM

FPGA

RAM

PROTECTED
MEMORY

MP

ROM

ASIC

NVM

HELPER DATA

METADATA

SENSORS

SELF-TEST
CIRCUITRY

EXTERNAL
HARDWARE
MODULES

SECURE ATTESTATION OF HARDWARE DEVICE

CROSS-REFERENCE TO RELATED APPLICATIONS

This application is a national stage application of International Patent Application No. PCT/IB2023/050892, filed Feb. 1, 2023, which claims priority to U.S. Provisional Patent Application No. 63/316,710, filed on Mar. 4, 2022, the subject matter of which are hereby incorporated by reference.

BACKGROUND

Physically Unclonable Functions (PUFs) are used to create a unique response by using implicit or explicit randomness. To create a PUF response, a PUF may be fed with a challenge, usually a binary string of fixed length. The PUF response can be used for cryptographic or device identity purposes, for example.

A potential benefit of using a PUF is that two identical PUFs on different devices/components generally result in different responses when the two identical PUFs are fed with the same challenges. Hence, the PUF is called "unclonable."

Implicit randomness in the PUF is typically based on unpredictable manufacturing differences in semiconductor devices, which can be exploited to create a device-unique response. Explicit randomness in the PUF, on the other hand, is typically based on the introduction of extra steps during manufacturing of the PUF or at a later stage, e.g., at packaging.

A PUF may include one or several subfunctions, each contributing with a part of the PUF response. The followings are three examples of subfunctions included in the PUF.

First, ring-oscillators. An uneven number of signal inverters in a ring uses gate delay propagation as a randomness source. The PUF response is a comparison between two or more ring-oscillators where the number of oscillations at a given point is measured. The result of the comparison can, e.g., be the identifier of the fastest/slowest ring oscillator.

Second, uninitialized static random-access memory (SRAM) memory cells, which have two possible states (0 and 1). Prior to power up, the cell is in neither state. At powerup, the cell stabilizes in one of the two states. The PUF response is the stabilized (entered) state.

Third, an arbiter, which might be regarded as a digital race condition between two or more signal paths on a chip where a so-called arbiter circuit identifies a winning signal. The paths might comprise several switch blocks, which can alter the signal paths. For example, the PUF response can be an identification of the winning signal.

The PUF response can be used to create a unique device identity or a device unique key, without having to store the key in, e.g., Battery Backed Random Access Memory (BBRAM) or One Time Programmable (OTP) memory. Hence, it may be harder for an attacker steal a key from a device using a PUF, as the key is never stored, long-term, on device.

There are several types of PUFs, but they can generally be divided into two different categories, capable of a few challenge-response pairs (CRPs) and those have a large set of CRPs. The latter (having a large of set of CRPs) can produce several different responses by using different challenges as input. The former (having a few CRPs) only allows one or a few challenges. If the PUF only accepts a single challenge, the challenge may be hard-coded or omitted.

Most PUF types additionally require error correcting codes (often called 'helper data') to function properly, i.e., to increase the possibility of recreating the same response given the same challenge. Some PUF types can remap the challenge-response mapping one or several times. That is, after a remapping of the challenge-response mapping, some or all challenges result in new responses.

An example of this type of PUF is a 'reconfigurable PUF' that can alter the entire challenge space, i.e., that all challenges receive a new response. An 'erasable PUF,' on the other hand, is a PUF that has the possibility to change responses of specific challenges. Alternatively, an 'erasable PUF' may respond with a null value (e.g., all zeros) for challenges marked as "erased." When a PUF response (or a derivation of the PUF response) is used to encrypt another cryptographic key, the PUF response is called "key encryption key" (KEK).

'Measured boot' includes measuring (e.g., hashing) every component loaded on the system and storing the result in a boot register. Such boot register is usually extendable rather than directly writable, e.g., as $R_{i+1}=OWF(R_i||ArgumentOfExtend)$. The result stored in the boot register can either be a hash chain, each individual hash or a combination of the two hashes.

'Trusted boot' is similar to a measured boot, but with validation of the values during the boot process. That is, the device itself knows what measurements to expect and if they differ, the device does not boot or enters a secure state.

'Secure boot' requires the use of cryptographic signatures that has to be rooted in a so-called Root-of-Trust (RoT). This is usually a fused key, which may either be unique for each device or a vendor key reused for many devices.

TPM functionality is specified by the Trusted Computing Group (TCG). There are two versions of the TPM functionality, which are relevant to today's devices: v1.2 and 2.0. When the TPM functionality is implemented as a discrete chip, it often offers some level of tamper resistance. There are also software/firmware-based implementations of the TPM specifications that usually does not provide physical security. TPMs provide a functionality to generate and use cryptographic keys, although there are usually a very limited set of supported cryptographic algorithms.

The TPM contains a set of registers, so called 'Platform Configuration Registers' (PCRs) that can be extended with hashed values, The PCRs are commonly used to measure the software during boot. Cryptographic keys can be wrapped by the TPM, and sealed to a specific content of the PCR, meaning that they are only decrypted by the TPM if the current measurements are as expected.

The TPM also contains a set of cryptographic keys to attest to the content of the CPRs, i.e., sign the values of the PCRs. This is commonly used for, so called, 'remote attestation' where a remote entity can verify that the loaded software is expected software.

Attestation refers to mechanisms to obtain confidence in the identity and the trustworthiness of a target platform. Attestation is rooted in some form of Public Key Infrastructure (PKI) used to identify the device, or a part of the device, which is typically a TPM in a computer, or a Trusted Execution Environment (TEE) in mobile devices. These credentials are typically used to issue signed statements of the measurement of a measured boot.

During the last decade, so called, 'invasive hardware attacks' have decreased in cost. Several kits are now available, which help an attacker scan for debug pins (such as Joint Test Action Group (JTAG)) and to identify buses that can be probed. Such kits can be utilized for an attacker to tap in or even to reroute information to external components.

A powerful invasive weapon for an attacker is a Focused Ion Beam (FIB), which is available including operating engineers, for merely ~$500/hour. A FIB can e.g., reroute signal paths, disable components and reprogram OTP memory.

Furthermore, the trend of utilizing cloud and edge services may open up new attack vectors. Hardware components in cloud deployments can be altered and replaced. It is very hard to detect, for a cloud tenant utilizing the hardware components.

U.S. Patent Application Publication No. 2021/0314365 A1 ("End-to-end device attestation," hereinafter "Smith") describes a method for attesting hardware. In Smith, the hardware is divided into two layers: a first layer and a second layer. The first layer attests the characteristics of the second layer. The characteristics of the second hardware layer is described by firmware, read-only memory, storage memory, fuses, straps, softstraps, or electronic fuses. Once the second hardware layer is attested, it may be utilized to be attest a software layer. Smith briefly mentions a PUF as a possible alternative implementation of fuses.

Using a single device PUF to create a key, which acts as root of trust, e.g., for a boot sequence, is known and utilized by several products in the markets today. For example, in Xilinx's 'Secure Boot Ultrascale+' document, the PUF is used to create a KEK for a boot encryption key.

Utilizing several PUFs on the same platform, e.g., by utilizing different entropy sources, also is known in the art. U.S. Pat. No. 8,699,714 B2 ("Distributed PUF") describes a solution where several different memory components are used to create a unified PUF response. U.S. Pat. No. 9,558,358 B2 ("Random number generator in a virtualized environment") describes a method to utilize different entropy sources in a virtual environment to create a "virtual PUF."

SUMMARY

The inventors have recognized certain shortcomings of existing solutions. For example, current measured and trusted boot solutions only consider the status of Software (SW) and Firmware (FW) of the PUF. The status of the SW and the FW does not give any information regarding the status of Hardware (HW) of the PUF and, particularly, not what modules of the HW comprise.

Smith mitigates this problem by measuring the state of the HW prior to boot but does not protect against malicious hardware module replacements, e.g., using spoofed values. Smith briefly mentions a PUF as a possible fuse replacement. However, Smith explicitly mentions that no secret values may be used in the attestation. Thus, the PUF response is not secret and can be spoofed, or the PUF response is secret and cannot be attested.

Certain contemporary solutions, such as Xilinx's 'Secure Boot Ultrascale+, leverage a single PUF as root-of-trust for trusted boot. However, such solutions are aimed at protecting or generating a root key for the device. These solutions cannot detect hardware replacements.

Built-in self-test (BIST) is another method to assure correctly functioning hardware. However, the BIST is aimed at testing non-malicious components and can therefore be spoofed by an attacker-replaced component. Branding every component with a unique identification/identifier (ID), e.g., stored in fuses, makes it feasible to copy that exact component to replace it with a counterfeit component having the same ID.

Some embodiments of the disclosed subject matter may provide solutions to these or other challenges. Some embodiments may provide improvements to current measurement-based boot protection mechanisms, such as measured and trusted boot. Some embodiments may enhance contemporary processes, in which each loaded SW/FW/BS (bitstream) (Field Programmable Gate Array (FPGA) configuration) is measured and stored in a register for verification at a later point in time (e.g., during device attestation), also by adding hardware measurements.

Some embodiments provide unique PUF responses for usage for HW modules within a system or a device. The unique PUF responses are combined with SW/FW/BS measurements and written to measurement registers. By equipping each HW module with a unique, unclonable and unpredictable PUF response, replacing the component will result in a different measured boot. By doing so, the measured boot is tied not only to correct SW/FW/BS being loaded, but also to correct HW components being present.

In some embodiments, the PUF response is combined with a metadata and internal measurements, which can be utilized to identify that (i) the component has not been replaced, (ii) the component is a type expected by a user, and (iii) the component is functioning correctly according to sensors and BISTs.

In some embodiments, a system or a device comprises one or several HW modules. At least one HW module produces a unique output, partly or fully, generated by a unique function. In some embodiments, the system or the device comprises circuitry to create a (collect) measurement based, at least partly, on an output from the HW modules. In some embodiments, the system or the device further comprises protected memory where the measurements are stored.

In some embodiments, the measurement comprises an output from a first HW module with measurements from a SW/FW/BS or configuration loaded on the first HW module. In some embodiments, the unique function comprises a) PUF, b) parametrized one-way function (OWF) (such as a Medium Access Control (MAC) function) or c) a combination of a) and b). In some embodiments, the unique output may additionally comprise one or more of a) a metadata, b) sensor readings, c) self-attestation results, and d) hardware configuration.

This disclosure also presents a method for creating a measured boot sequence dependent on the measurement of the SW/FW/BS and on the ID embedded in each module.

Some embodiments may provide one or more of the following technical advantages. Some embodiments make it possible to attest a SW/FW/BS during a measured boot and to attest unique outputs of the HW modules. These attestations of the SW/FW/BS and the unique outputs can be read out either during manufacturing, prior to deployment, or be always kept internally depending on use case and trust model.

Because the HW module contains a unique "fingerprint," it is difficult for an attacker to replace the HW module without the measurements during a measured boot detecting it. This makes it possible to remotely attest that the HW module is as expected.

Some embodiments can be combined with metadata and BIST functionality to ensure correct functioning and correctly deployed HW. Some embodiments raise a bar against an attacker, as creating a component with an equal PUF response cannot be easily done, since the PUF (per definition) is unclonable.

BRIEF DESCRIPTION OF THE DRAWINGS

The drawings illustrate some embodiments of the disclosed subject matter. In the drawings, like reference labels denote like features.

DETAILED DESCRIPTION

The following description presents various embodiments of the disclosed subject matter. These embodiments are presented as teaching examples and are not to be interpreted as limiting the scope of the disclosed subject matter.

Figure 1:
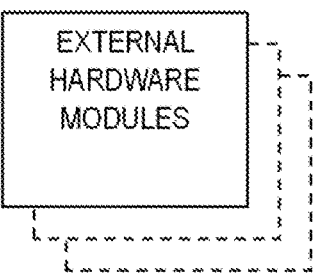
FIG. 1 illustrates blocks or components of a device, according to some embodiments of the disclosed subject matter.

FIG. 1 illustrates blocks or components of a device according to some embodiments of the disclosed subject matter. As illustrated, the device comprises one or more hardware (HW) module(s). Each of the HW module(s) may comprise a Physically Unclonable Function (PUF), protected memory, Non-Volatile Memory (NVM), and HW components. The HW module may comprise a One-Way Function (OWF), a fuzzy extractor, self-test circuitry, and sensors. Optionally, the NVM may comprise a block to store helper data and a block to store meta data, as illustrated in FIG. 1. Each hardware module may comprise one or several hardware components, which may comprise a Central Processing Unit (CPU), Graphic Processing Unit (GPU), FPGA, microcontroller, custom accelerator, memory or the like, as illustrated in FIG. 1.

Embodiments of the disclosed subject matter do not require all HW modules to have PUFs. It is possible to combine PUF-enabled HW modules with conventional HW modules. This combination may omit supplying a hardware-unique output, send an output stored in Non-Volatile Memory (NVM) or send a standardized output, such as all zeros.

Figure 2:
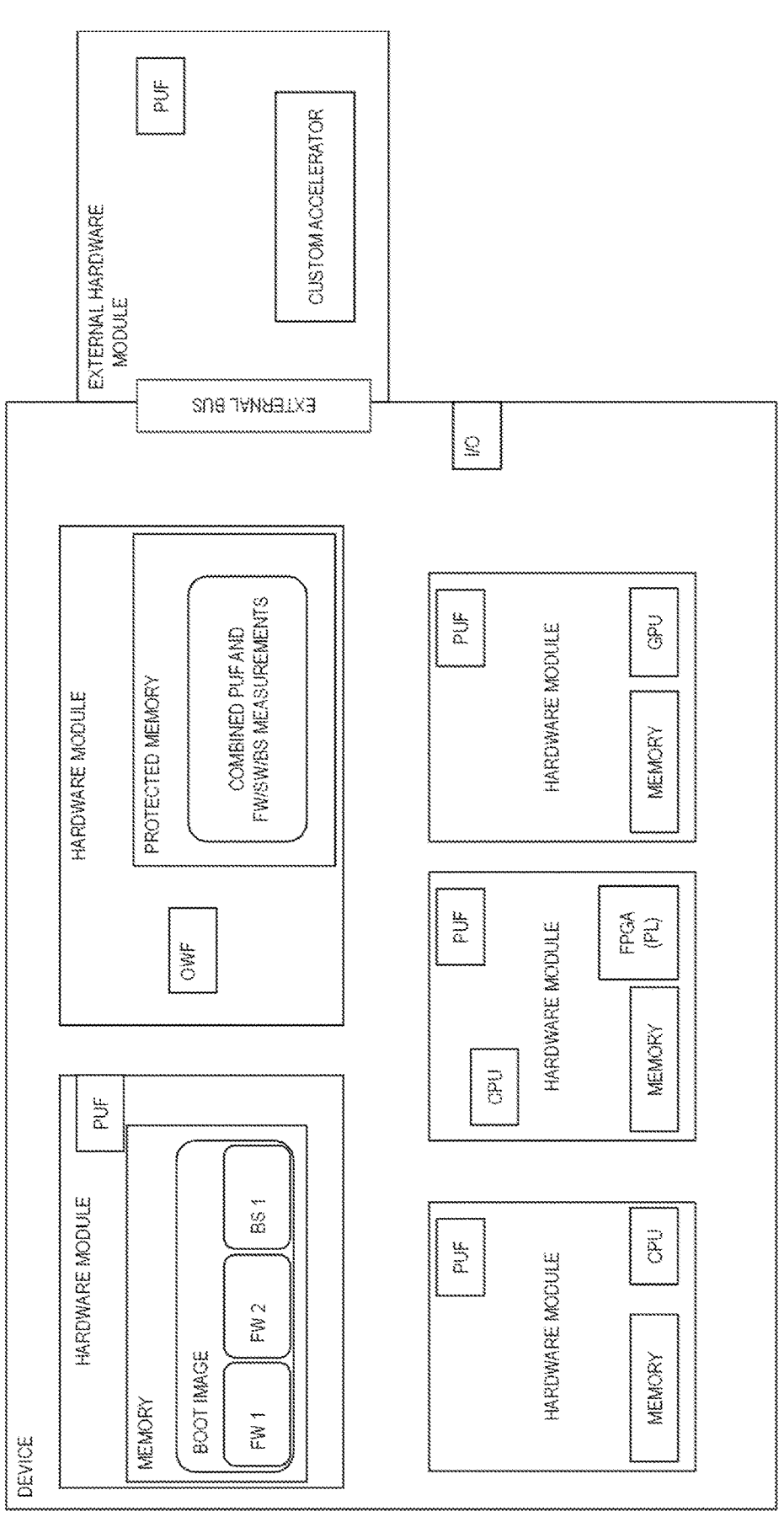
FIG. 2 illustrates an example of a device that is connected to an external hardware module via an external bus, according to some embodiments of the disclosed subject matter.

FIG. 2 illustrates an example of a device that is connected to an external hardware module via an external bus. The HW module may be embodied, fully or party, by an integrated module (such as a chip, chiplets, system-on-chip, network-on-chip etc.) or an external module (for example, "External hardware modules" in FIG. 1 and "External hardware module" in FIG. 2) (such as an accelerations card, external RAM, disk storage etc.) connected to the integrated module via an external bus (such as Peripheral Component Interconnect express (PCIe), Serial Advanced Technology Attachment (SATA), Universal Asynchronous Receiver-Transmitter (UART), Serial Peripheral Interface (SPI), Inter-Integrated Circuit (I2C), Universal Serial Bus type C (USB-C), or Ethernet).

Figure 3:
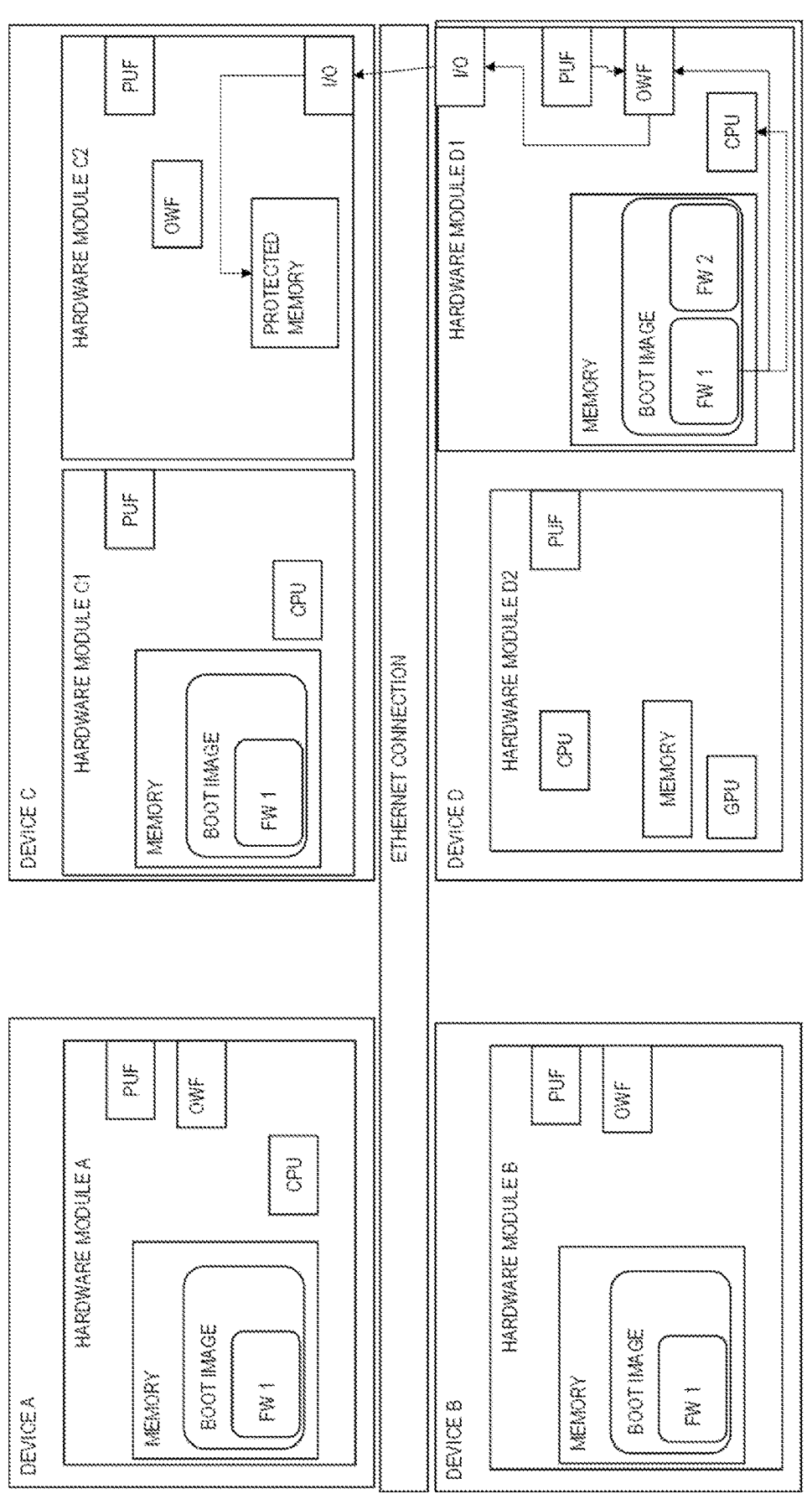
FIG. 3 illustrates an example of a device that is connected to an external hardware module via an ethernet connection, according to some embodiments of the disclosed subject matter.

While a single device is illustrated in FIGS. 1 and 2, FIG. 3 illustrates a system comprising multiple devices (for example, devices A to D). A difference between these two cases (a single device and a system comprising multiple devices) is that a device has direct contact with the HW modules that the device measures, while, in a system, the HW modules of the system may exist with other devices of the same system.

As illustrated in FIG. 3, each device includes at least one HW module, which comprises the PUF. Certain embodiments of the disclosed subject matter may be implemented in cloud scenarios, where several devices (such as Devices A to D of FIG. 3) are interconnected, e.g., using an ethernet connection. Such embodiments may function in similar fashion to scenarios using a single device, with a difference that some PCR may measure a boot procedure of external devices. In such scenarios including multiple devices, one device—a "main device"—could be responsible of validating both its own and the other devices HW modules. Each device could use a private key to ensure that the measurements are correct, and the corresponding public key needs to be available for the main device.

Certain embodiments of the disclosed subject matter are built on one or several HW module(s) within the system or the device being equipped with a unique function for the HW module. An intention of this unique function is to provide an output indicating that the HW module has not been replaced. To ensure the integrity of the system or the device, the output should not be easily spoofed or cloned.

In some embodiments, the unique function is embodied as a PUF on the HW module. The output from the HW module is based on the PUF response. While a PUF is the preferred choice, due to the unclonable properties of the PUF, it is not the only possible implementation option for the unique function. The functionality of the PUF is to provide a secret value for each HW component. There are other ways of performing this, albeit without the unclonable property. In one alternative embodiment, a parametrized One-Way Function (OWF), e.g., a keyed Medium Access Control (MAC), where the key is randomly selected and programmed into NVM or One Time Programmable (OTP) memory, fulfills the same functionality as a PUF with a fuzzy extractor.

In some embodiments, the PUF is considered to have a single challenge-response pair (CRP) that does not change over time. In an alternative embodiment, the PUF response is dependent on an input to the PUF. That is, the PUF takes a challenge, either created from external or internal input, which may alter the PUF response, as explained below.

The PUF in each HW module receives a challenge, which may (a) be generated internally, (b) be specified in the boot image, or (c) be supplied externally. This challenge is supplied to the PUF, and then, the PUF creates a response correlated to the challenge. The challenge may e.g., be created by a Random Number Generator (RNG) within the device or be supplied externally. In these cases where the PUF is able to receive a vast number of challenges, a new challenge may be supplied for each measurement. Hence, individual PUF response itself is no longer a secret as an attacker finding out a single response will not supply any information on the next response. However, this either requires the attesting entity to store multiple PUF responses in a database or for the PUF to be mathematically model-lable. In the latter case, the attesting entity stores a math-ematical model of the PUF and simulates the challenge-response behavior by using this mathematical model.

In some embodiments, an output from the HW module (comprising the PUF) comprises a PUF response. The output is used to verify the HW module, i.e., an indication that the HW module is the expected hardware module. The output is not impacted by the configuration of HW module itself and returns the same output when requested.

In an alternative embodiment, the output further com-prises signals from the hardware or stored metadata. In other words, the output of the hardware module is extended by hardware module measurements or metadata, as explained below.

In the alternative embodiment, the PUF response, which is supplied from the HW module, is appended by measure-ments from the HW module itself. Such measurements may comprise measurements from sensors (e.g., measuring heat, voltage, electromagnetic radiation), results from self-attes-tation (e.g., checking component functionality and integ-rity), and configuration options (such as fuses).

Alternatively, or additionally, each HW module stores metadata in NVM or OTP. Such metadata may comprise (a) manufacturer identifier, (b) type identifier/model number, and (c) capabilities of the hardware module, such as speed grade, memory capabilities, or size of programmable logic etc.

These values can be appended to the PUF response as an output. An example output can take the form of: Output= (PUF response‖Manufacturer ID‖Type ID‖Self-attestation result).

PUF responses for the HW modules are treated as secrets and must either be read out during manufacturing or before deployment of the system or the device depending on trust model. The PUF responses must be available during attes-tation to the verifier. If the verifier is internal, which is the case in trusted boot, the PUF responses does not have to be made available outside of the device.

As the PUF is a probabilistic function, some PUF imple-mentations may additionally require error correcting codes (so called, helper data) to function correctly. This may require the PUF to go through an enrollment process, where unstable PUF response bits may be removed, and helper data may be created and stored.

As the randomness in the PUF may be biased, a fuzzy extractor may be used to perform both error correction and increase the uniformity of the randomness. In these cases, the fuzzy extractor takes the PUF response as an input and outputs a deterministic but uniformly random binary string.

Certain embodiments can be advantageously used during the boot process of the device. During this process, outputs from all HW modules are collected by one dedicated HW module, also called "the requester", and the outputs are written to protected memory. This procedure can be done during the first boot step (e.g., basic input/output system (BIOS)), and the results can be stored in secure registers (e.g., Platform Configuration Registers (PCR)), where the values are either written in separate registers or extended as described in the above background section about the PUFs. In some boot scenarios, initialization/boot of different modules may be performed stepwise, and typically, the PUF response for a module cannot be queried before it has been initialized. Hence, the reporting of the values into registers would also be performed stepwise as the modules initialize.

Alternatively, or in addition, an output of the HW module can be combined with the SW/FW/BS measurements before being written to protected memory. This makes it possible to link the HW module that received the FW/SW/BS with the measurements of the FW/SW/BS. That is, the value written in the protected memory will be different if a first HW module loads a first software binary vs. if a second HW module loads a hardware module.

The output of the hardware module and the measurements of SW/FW/BS can be used to create a joint measurement by combing the two (the hardware module output and the measurements) as an input to a one-way function (OWF), e.g., a hash function. In short, the following process is performed: (Hardware module output‖Software measure-ment)→OWF→Joint Measurement The following description provides an example of mea-sured boot according to some embodiments of the disclosed subject matter. In the examples, a device comprising several HW modules starts the boot process by initializing a boot-loader component that is responsible for loading the boot image.

The PUF response from the HW module is combined with the SW/FW/BS, intended to be executed by or deployed on the hardware module. By joining the PUF response and the SW/FW/BS into a joint measurement, the measured boot process can record a measurement indicating (a) what was loaded and (b) what HW module it was loaded to.

Figure 4:
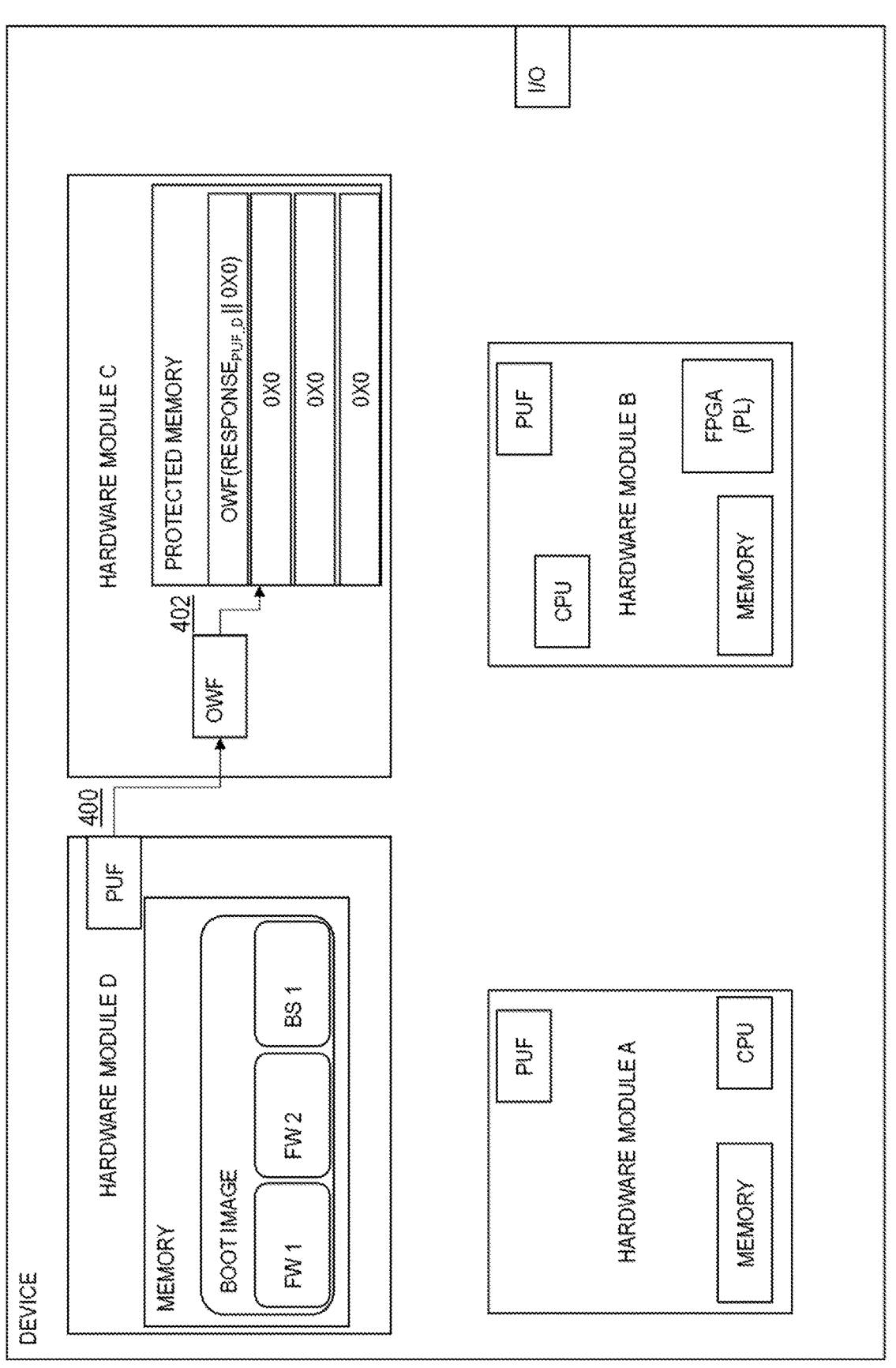
FIG. 4 illustrates a first step in an example of measured boot, according to some embodiments of the disclosed subject matter.

FIG. 4 illustrates a first step in the example of measured boot, where the bootloader component is measured and written to PCR, according to some embodiments of the disclosed subject matter. Hardware module C is, in the first step of this example, embodied by a discrete or integrated TPM. In other embodiments, this functionality may be supplied by a firmware TPM, a hypervisor TPM or a software TPM. Hardware module C may be referred to as the "requester." It is also entirely possible to use a non-TPM solution as long as protected memory is available. It should be noted that the protected memory registers often may not be written directly, but rather may be extended with a known initial value. Therefore, the initial value of the registers must be known, in this example, the initial value of the registers is zero, i.e., 0x0.

As illustrated in FIG. 4, Hardware module D, which contains the bootloader, is measured as a first step of the measured boot. As illustrated in step 400 of FIG. 4, the measurement, i.e., the PUF response, is supplied to an OWF. In step 402, the measurement is written to the first PCR.

Figure 5:
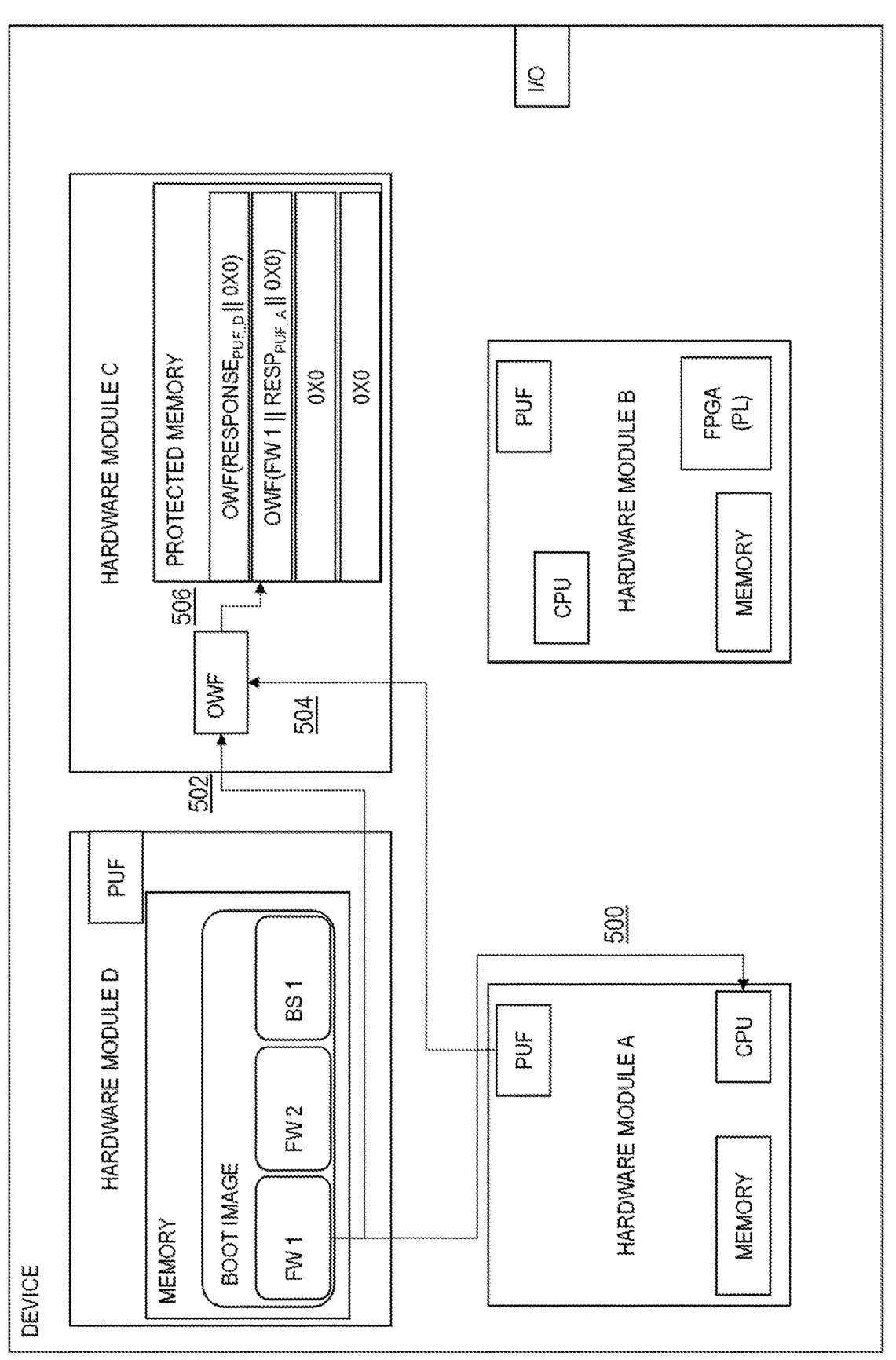
FIG. 5 illustrates a second step in an example of measured boot, according to some embodiments of the disclosed subject matter.

FIG. 5 illustrates a second step in the example of mea-sured boot, where a firmware 1 ("FW1") is loaded and measured by Hardware module A (step 500). In step 502 and step 504, the measurement of the firmware and the PUF response of the hardware module are supplied to the OWF and extends the second PCR (i.e., are stored in the second PCR) (step 506).

Figure 6:
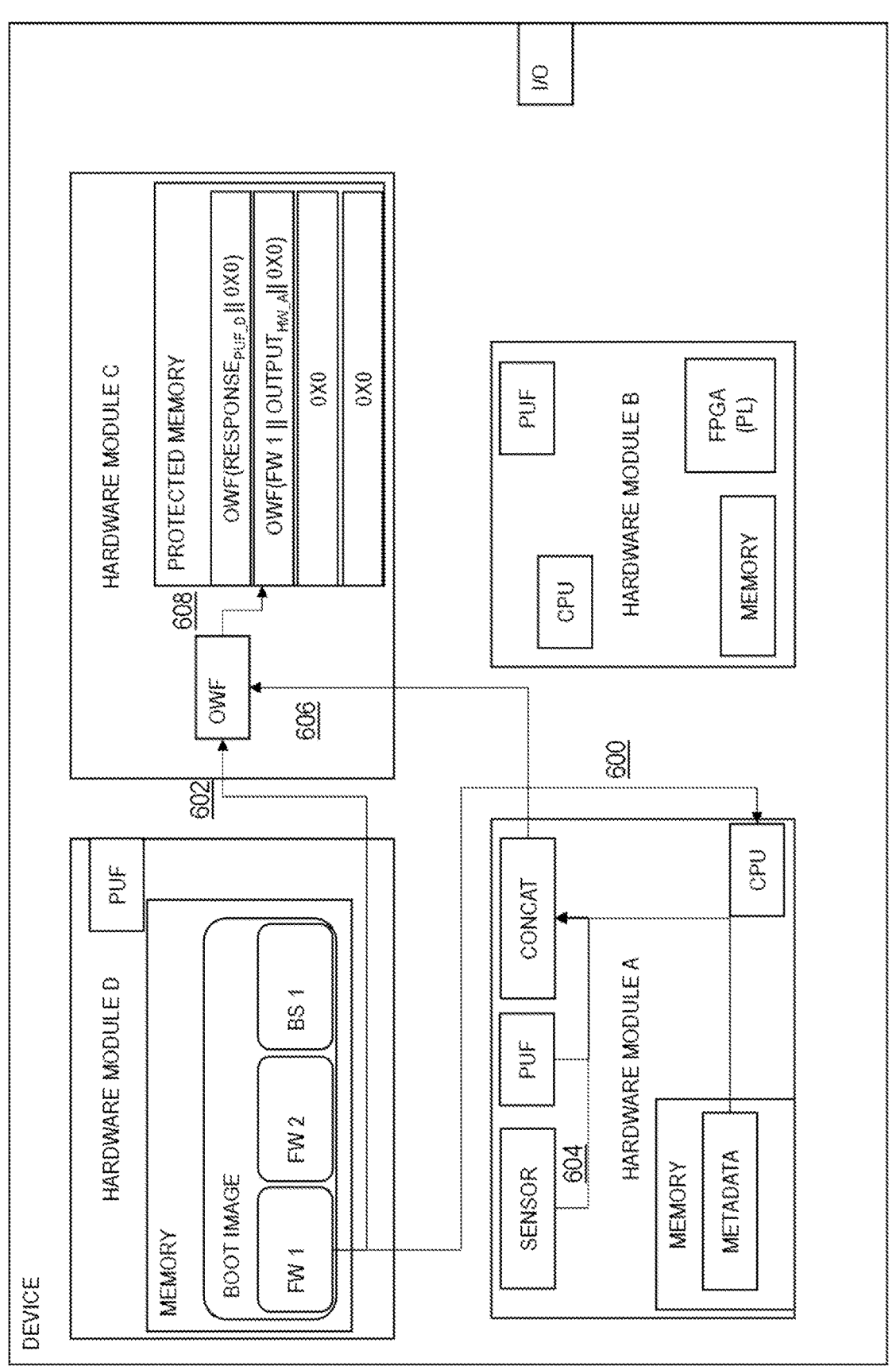
FIG. 6 illustrates an alternative step of a second step in an example of measured boot, according to some embodiments of the disclosed subject matter.

FIG. 6 illustrates an alternative step of the second step in the example of measured boot, where the output of the hardware module is extended by the hardware module measurements or metadata. In other words, the output from Hardware module A in FIG. 6 additionally comprises as sensor reading or metadata for the hardware module, as illustrated in step 604 of FIG. 6. The steps 600, 602, 606, and 608 are same as steps 500, 502, 504, and 506 of FIG. 5, respectively.

Figure 7:
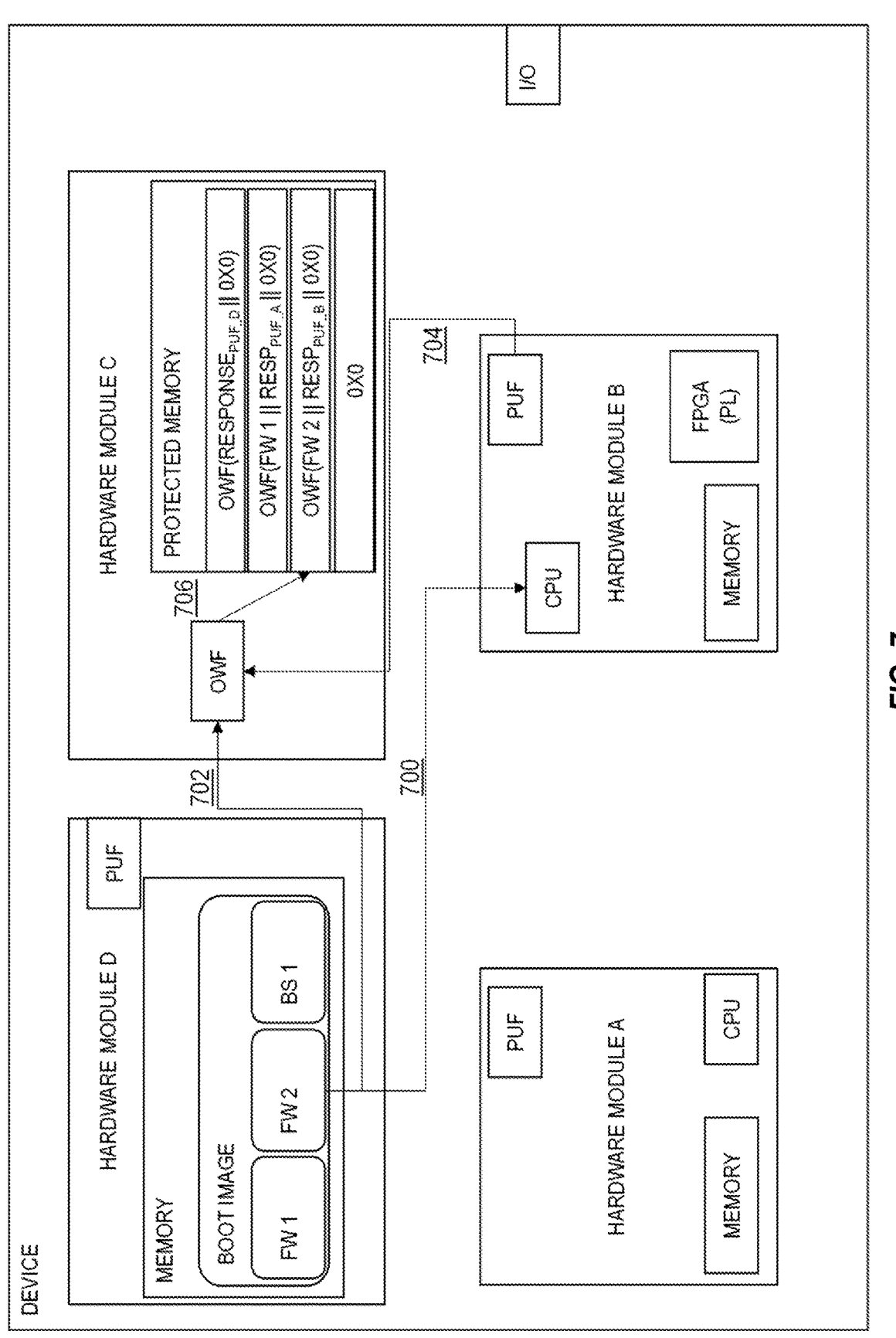
FIG. 7 illustrates a third step in an example of measured boot, according to some embodiments of the disclosed subject matter.

FIG. 7 illustrates a third step in the example of measured boot, where a firmware 2 ("FW2") is loaded and measured by Hardware module B (step 700). The measurement of the firmware 2 and the PUF response of the hardware module are supplied to an OWF (steps 702 and 704) and extends the third PCR (i.e., are stored in the third PCR) (step 706).

Figure 8:
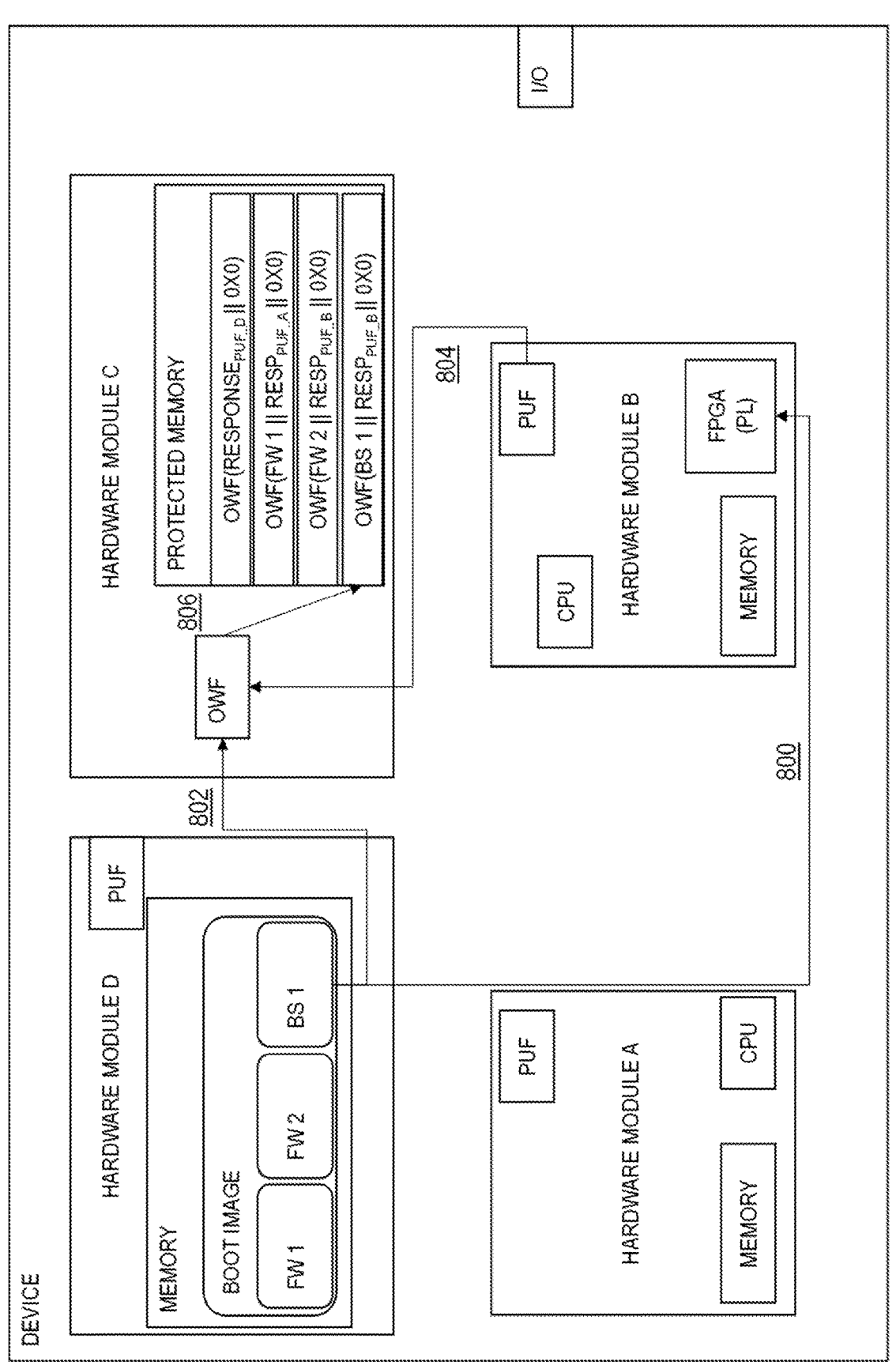
FIG. 8 illustrates a fourth, final step in an example of measured boot, according to some embodiments of the disclosed subject matter.

FIG. 8 illustrates a fourth, final step in the example of measured boot, where bitstream 1 ("BS1") is deployed to Hardware module B (step 800). The bitstream component and the PUF response of the hardware module are supplied to the OWF (steps 802 and 804) and extends the fourth PCR (i.e., are stored in the fourth PCR) (step 806).

After the device has been booted, an external entity (an attester) requires the device for the boot measurements. The device supplies these measurements that can verified by the attester. The attester knows the expected FW/SW/BS components and also knows (or is able to query a trusted vendor service for) the HW module's PUF responses.

Figure 9:
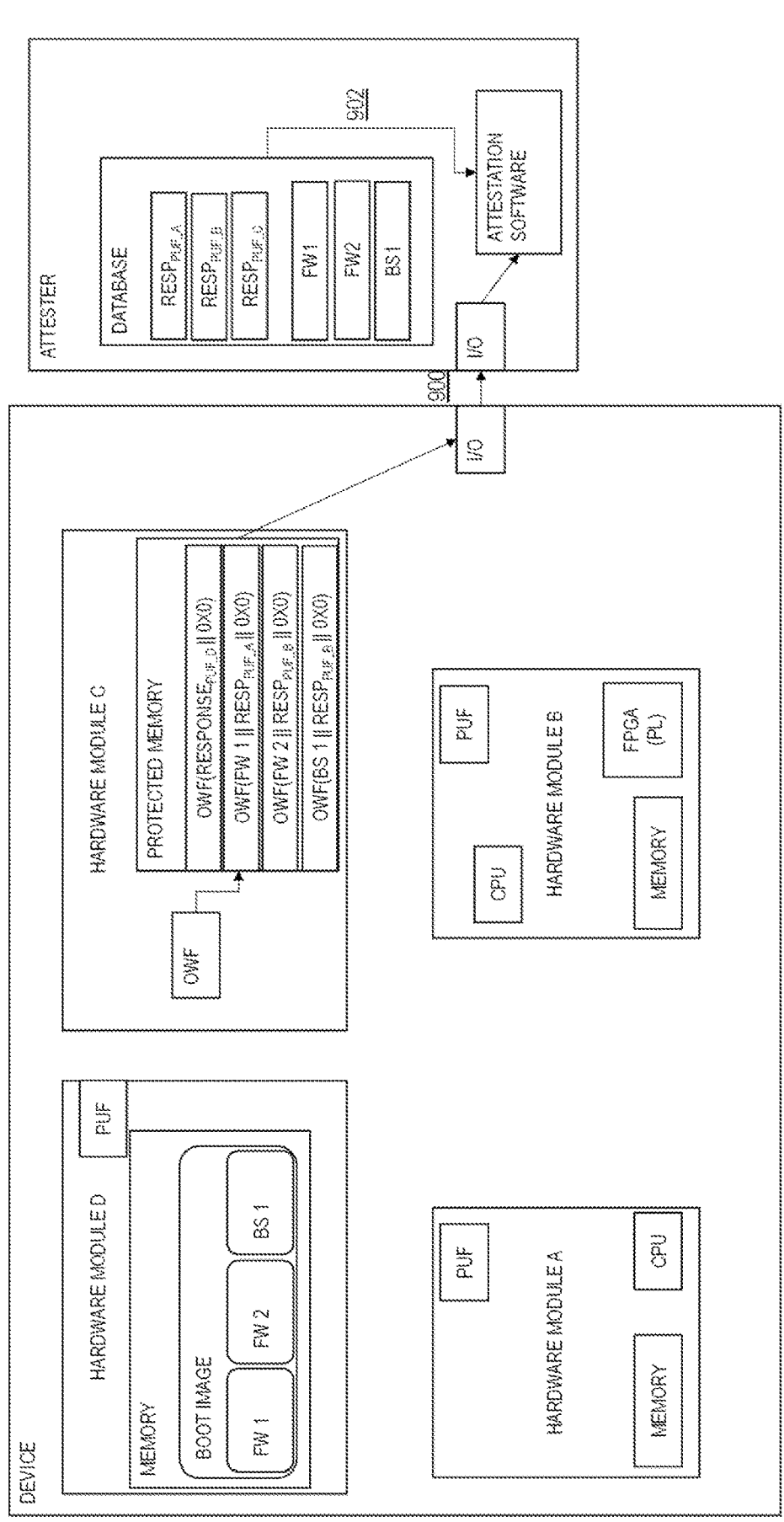
FIG. 9 illustrates an attester, according to some embodiments of the disclosed subject matter.

FIG. 9 illustrates that the attester knows a PUF response ("$RESP_{PUF\_A}$") and a firmware component ("FW1") because those values are stored in its database. The attester requests and receives the measurements ("OWF (FW1‖$RESP_{PUF\_A}$‖0x0)") from the device (step 900). After retrieving the known PUF response ("$RESP_{PUF\_A}$") and the firmware component ("FW1") from its database (step 902), the attester compares the known values and the received values using the attestation software. How these values can be stored by different parties is explained in different use cases described below.

If the values are as expected, the device is deemed to be legitimate and can be used as intended. It should be noted that the attestation process, in reality, may be much more complex and that this example has omitted a root-of-trust and a cryptographical signature involved the attestation.

Figure 10:
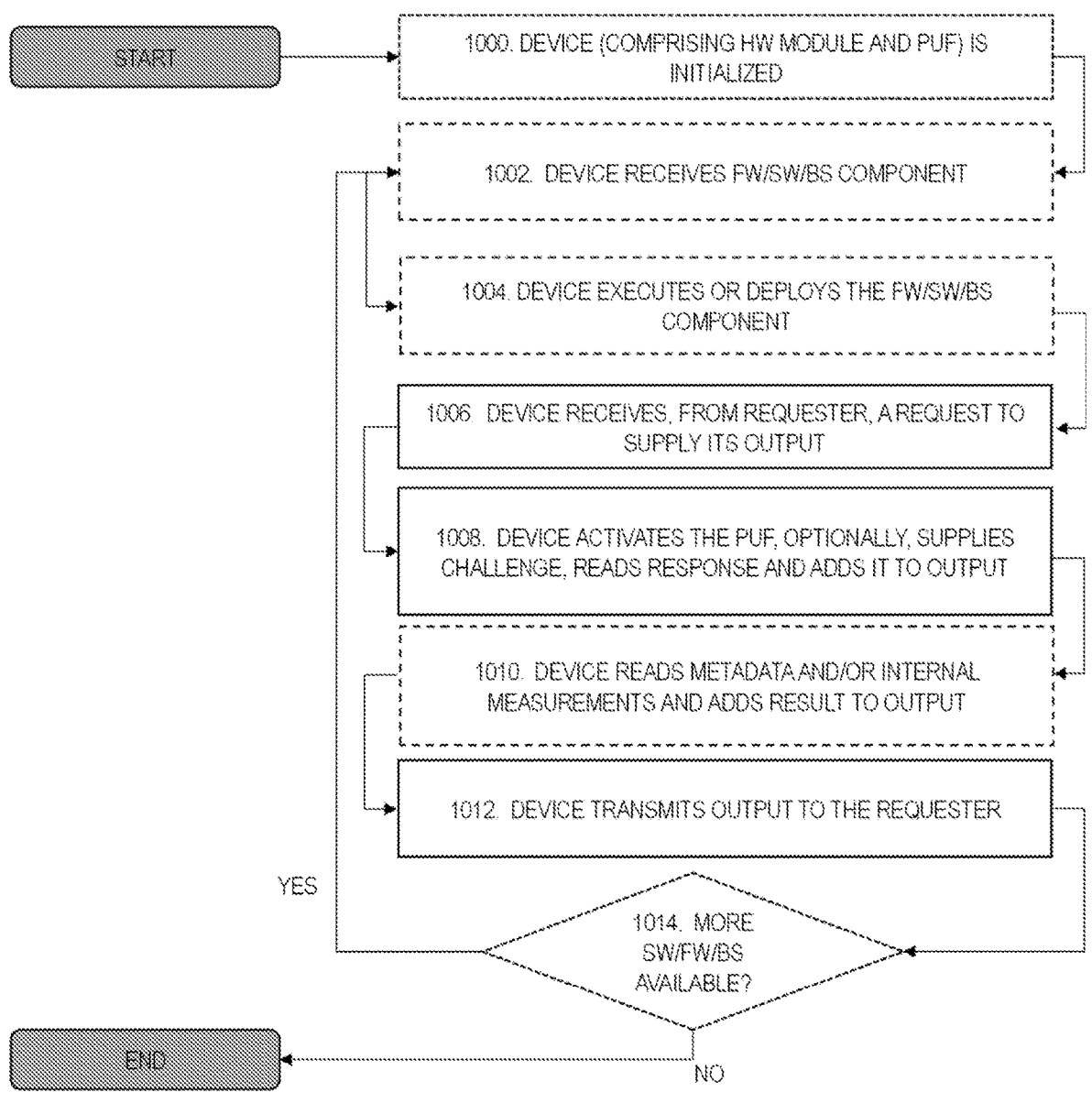
FIG. 10 illustrates some steps of a method according to some embodiments of the disclosed subject matter.

FIG. 10 illustrates some steps of a method according to some embodiments of the disclosed subject matter.

In step 1000, optionally, a device (comprising a plurality of HW modules wherein at least one hardware module comprises a PUF) is initialized. For example, one HW module is initialized.

In step 1002, optionally, the device (e.g., the HW module) receives a component, such as one or more of FW, SW, or BS components.

In step 1004, optionally, the device (e.g., the HW module) executes or deploys the component, such as one or more of FW, SW, or BS components.

In step 1006, the device (e.g., the HW module) receives, from a requester, a request to supply its output.

In step 1008, the device (e.g., the HW module) activates the PUF, reads a response from the PUF, and adds the response to an output. Optionally, the device supplies a challenge to the PUF.

In step 1010, optionally, the device (e.g., the HW module) reads metadata and/or internal measurements and adds the metadata and/or the internal measurements to the output. For example, the internal measurements are related to the one or more of FW, SW, or BS components.

In step 1012, the device (e.g., the HW module) transmits the output to the requester.

In step 1014, optionally, if there are more FW, SW, or BS components, the above steps 1002 to 1012 are repeated.

Figure 11:
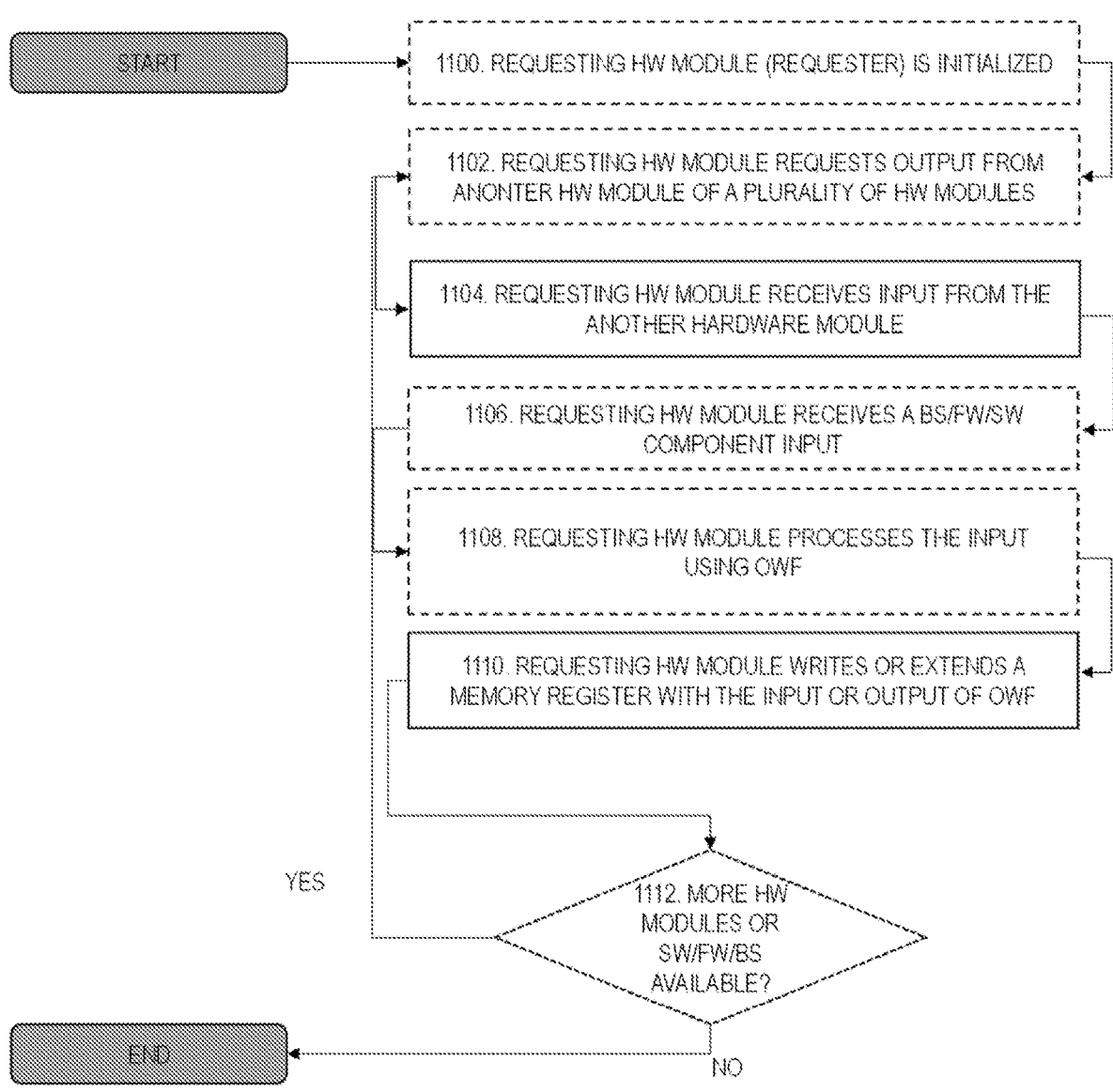
FIG. 11 illustrates some steps of a method according to some embodiments of the disclosed subject matter.

FIG. 11 illustrates some steps of a method according to some embodiments of the disclosed subject matter.

In step 1100, optionally, a requesting HW module (e.g., within the device) is initialized.

In step 1102, optionally, the requesting HW module (e.g., within the device) requests an output from another HW module of a plurality of HW modules.

In step 1104, the requesting HW module receives an input from the another HW module.

In step 1106, optionally, the requesting HW module further receives an input of BS/FW/SW components.

In step 1108, optionally, the requesting HW module processes the input using OWF. The input to the requesting HW module may comprise the input from the another HW module or the input of BS/FW/SW components. The OWF generates an output after processing the inputs to the requesting HW module.

In step 1110, the requesting HW module writes or extends a memory register with the input or the output of the OWF.

In step 1112, optionally, if there are more hardware modules in the plurality of hardware modules or more FW, SW, or BS components, the above steps 1102 to 1110 are repeated.

Some use cases according to the embodiments of the disclosed subject matter are disclosed below.

In one use case, the output of the HW modules may be extracted by an owning company before deployment of the product. That is, after buying a product containing HW modules with PUFs, the owning company is responsible to activate and utilize this functionality. In such a scenario, the PUF may be a type of a PUF that is not readable during manufacturing, e.g., a PUF in which the response is not extractable or does not exist prior to enrollment. The owning company may store the PUF values within an internal database and verify the correctness of the hardware modules through an attestation process.

In another use case, the PUF response is read out, either during manufacturing process or in a secure facility after manufacturing. The PUF responses are stored outside of the device by the vendor, or by a party trusted by the vendor.

This is potentially relevant in a scenario where a device is manufactured by one company and sold to customers, e.g., as Commercial off-the-shelf (COTS) hardware. To ensure that the device comprises the same HW modules as intended, i.e., has not been tampered with during the supply chain, the end-user can request validation of the device from the vendor service. In some solutions, self-attestation can be performed by requesting expected values from the vendor and compared. In other solutions, the measurements can, either, be sent automatically (by the device) or manually (by the end-user) to the vendor, together with a device ID, which can verify the authenticity of the HW modules in the device.

By storing the PUF responses in a vendor-controlled environment, an online vendor service can be used to validate the correctness of the SW and the HW of the device using measured boot and remote attestation.

This also applies to as Infrastructure as a Service (IaaS) scenarios, where the user does not necessarily trust the Cloud Service Provider (CSP). In such a scenario, the user can query the measurements of a specific device and receive a confirmation from the vendor that the device is the expected device.

In yet another use case, the embodiments of the disclosed subject matter can be used in a trusted boot procedure, where the boot is measured and validated within the device. This can be done by storing the intended PUF values in NVM within a trusted storage space, or to seal data with a TPM in the device. Just as devices utilizing trusted boot need to update reference values for software when the software is patched, any hardware module replacements, e.g., due to service, needs to be updated in NVM.

In some embodiments, some or all of the functionality described herein may be provided by processing circuitry executing instructions stored in memory, which in some embodiments may be a computer program product in the form of a non-transitory computer-readable storage medium. In alternative embodiments, some or all of the functionalities may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole and/or by end users and a wireless network generally.

The invention claimed is:

1. A method performed by a system comprising a plurality of hardware modules including a requester module and one or more further modules, each further module including a respective Physically Unclonable Function (PUF), the method comprising the requester module:

for each further module, obtaining a respective joint measurement based on a combination of a hardware output of the further module and a software measurement of the further module, the hardware output being unique to the further module and dependent upon a PUF response generated by the further module responsive to a request sent by the requester module, and the software measurement being a measurement of one or more of a firmware, software or bitstream component associated with the further module; and using the respective joint measurements in at least one of a boot verification process and a remote attestation process, for verifying a combined hardware and software integrity of each respective further module, wherein verification of the combined hardware and software integrity of each respective further module depends upon comparing the respective joint measurement obtained for each respective further hardware module with a respective trusted joint measurement known for that further hardware module.

2. The method of claim 1, wherein the hardware output of each further module includes the PUF response and one or more of metadata and internal measurements of the further module.

3. The method of claim 1, wherein each further module outputs the respective joint measurement responsive to the request sent by the requester module, based on using a one-way function or hash having as inputs the respective hardware output and the respective software measurement.

4. The method of claim 1, wherein the requester module generates the joint measurement for each further module based receiving the respective hardware outputs from the one or more further modules, performing the respective software measurements for the one or more further modules, and computing the respective joint measurements according to a one-way function or hash.

5. The method of claim 1, wherein the one or more further modules includes at least first and second further modules.

6. The method of claim 1, wherein the requester module includes protected memory and wherein the method includes the requester module storing the respective joint measurements in the protected memory.

7. The method of claim 6, wherein the respective joint measurements are used in a boot verification process and wherein the method further comprises the requester module obtaining and storing the respective trusted joint measurements in a protected memory prior to performance of the boot verification process.

8. A system comprising a plurality of hardware modules including a requester module and one or more further modules, each further module comprising a respective Physically Unclonable Function (PUF) and wherein the requester module comprises circuitry configured to:

for each further module, obtain a respective joint measurement based on a combination of a hardware output of the further module and a software measurement of the further module, the hardware output being unique to the further module and dependent upon a PUF response generated by the further module responsive to a request sent by the requester module, and the software measurement being a measurement of one or more of a firmware, a software, or a bitstream component associated with the further module; and use the respective joint measurements in at least one of a boot verification process and a remote attestation process, for verifying a combined hardware and software integrity of each respective further module, wherein verification of the combined hardware and software integrity of each respective further module depends upon comparing the respective joint measurement obtained for each respective further hardware module with a respective trusted joint measurement known for that further hardware module.

*     *     *     *     *